(12) United States Patent
Reimann et al.

(10) Patent No.: US 11,615,285 B2
(45) Date of Patent: Mar. 28, 2023

(54) GENERATING AND IDENTIFYING FUNCTIONAL SUBNETWORKS WITHIN STRUCTURAL NETWORKS

(71) Applicant: Ecole Polytechnique Federale De Lausanne (EPFL), Lausanne (CH)

(72) Inventors: Michael Wolfgang Reimann, Nyon (CH); Max Christian Nolte, Mies (CH); Henry Markram, Lausanne (CH); Kathryn Pamela Hess Bellwald, Aigle (CH); Ran Levi, Aberdeen (GB)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 768 days.

(21) Appl. No.: 15/864,146

(22) Filed: Jan. 8, 2018

(65) Prior Publication Data

US 2018/0197069 A1    Jul. 12, 2018

Related U.S. Application Data

(60) Provisional application No. 62/443,071, filed on Jan. 6, 2017.

(51) Int. Cl.
```
G06N 3/04      (2006.01)
G06N 3/08      (2023.01)
G06N 7/01      (2023.01)
```
(52) U.S. Cl.
CPC ............ *G06N 3/04* (2013.01); *G06N 3/08* (2013.01); *G06N 7/01* (2023.01)

(58) Field of Classification Search
CPC ............ G06N 3/04; G06N 7/005; G06N 3/08

USPC .......................................................... 706/25
See application file for complete search history.

(56) References Cited

U.S. PATENT DOCUMENTS

| | | | |
|---|---|---|---|
| 5,822,742 A | 10/1998 | Alkon et al. | |
| 7,321,882 B2 | 1/2008 | Herbert | |
| 7,412,426 B2 * | 8/2008 | Hercus ............ | G06N 3/10 706/15 |
| 8,818,923 B1 | 8/2014 | Hoffmann | |
| 9,558,442 B2 | 1/2017 | Canoy et al. | |
| 9,785,886 B1 | 10/2017 | Andoni et al. | |
| 9,875,440 B1 | 1/2018 | Lamport | |

(Continued)

FOREIGN PATENT DOCUMENTS

| | | |
|---|---|---|
| CN | 104318304 | 1/2015 |
| CN | 104335219 | 2/2015 |

(Continued)

OTHER PUBLICATIONS

Title: Overlapping Clusters for Distributed Computation Author: Reid Andersen, David F. Gleich, Vahab Mirrokni Date: Feb. 8-12, 2012, Seattle, Washington, USA Publisher: ACM (Year: 2012).*

(Continued)

*Primary Examiner* — Alan Chen
(74) *Attorney, Agent, or Firm* — Fish & Richardson P.C.

(57) ABSTRACT

In one aspect, a method includes generating a functional subgraph of a network from a structural graph of the network. The structural graph comprises a set of vertices and structural connections between the vertices. Generating the functional subgraph includes identifying a directed functional edge of the functional subgraph based on presence of structural connection and directional communication of information across the same structural connection.

23 Claims, 2 Drawing Sheets

(56) References Cited

U.S. PATENT DOCUMENTS

| | | |
|---|---|---|
| 10,019,506 B1 | 7/2018 | Li et al. |
| 10,417,558 B1 | 9/2019 | Bauer et al. |
| 10,510,000 B1 | 12/2019 | Lamport |
| 10,628,486 B2 | 4/2020 | Chu et al. |
| 10,650,047 B2 * | 5/2020 | Yanagisawa ........ G06F 16/9024 |
| 10,885,020 B1 | 1/2021 | Ablitt |
| 10,922,510 B2 | 2/2021 | Tscherepanow et al. |
| 11,195,038 B2 | 12/2021 | Nunn et al. |
| 11,218,498 B2 | 1/2022 | Hajimirsadeghi et al. |
| 11,250,326 B1 | 2/2022 | Ko et al. |
| 11,278,413 B1 | 3/2022 | Lang |
| 2004/0015459 A1 | 1/2004 | Herbert |
| 2006/0112028 A1 * | 5/2006 | Xiao ........................ G06N 3/08 706/15 |
| 2006/0184471 A1 | 8/2006 | Minamino et al. |
| 2008/0152217 A1 | 6/2008 | Greer |
| 2009/0012581 A1 | 1/2009 | Rhodes |
| 2009/0187736 A1 | 7/2009 | Raichelgauz et al. |
| 2014/0156901 A1 | 6/2014 | Raichelgauz et al. |
| 2015/0058352 A1 | 2/2015 | Brand |
| 2015/0206049 A1 | 7/2015 | Canoy et al. |
| 2015/0280906 A1 | 10/2015 | Shany et al. |
| 2015/0310303 A1 | 10/2015 | Andreopoulos et al. |
| 2015/0347870 A1 | 12/2015 | Andreopoulos et al. |
| 2015/0363689 A1 | 12/2015 | Henry et al. |
| 2016/0048756 A1 * | 2/2016 | Hall ..................... G06F 16/248 706/20 |
| 2016/0350648 A1 | 12/2016 | Gilad-Bachrach et al. |
| 2017/0124452 A1 * | 5/2017 | Tucker ..................... G06N 3/08 |
| 2017/0139759 A1 | 5/2017 | Bandara |
| 2017/0213131 A1 | 7/2017 | Hammond et al. |
| 2017/0229117 A1 | 8/2017 | van der Made et al. |
| 2017/0249536 A1 | 8/2017 | Hillar et al. |
| 2018/0018553 A1 | 1/2018 | Bach et al. |
| 2018/0053108 A1 | 2/2018 | Olabiyi et al. |
| 2018/0082171 A1 | 3/2018 | Merity et al. |
| 2018/0136912 A1 | 5/2018 | Venkataramani et al. |
| 2018/0157973 A1 | 6/2018 | El-Yaniv et al. |
| 2018/0165547 A1 | 6/2018 | Haung et al. |
| 2018/0197076 A1 | 7/2018 | Paik et al. |
| 2018/0247198 A1 * | 8/2018 | Vasudevan ........... G06N 3/0454 |
| 2018/0336453 A1 | 11/2018 | Merity et al. |
| 2018/0373985 A1 | 12/2018 | Yang et al. |
| 2019/0012574 A1 | 1/2019 | Anthony et al. |
| 2019/0036678 A1 | 1/2019 | Ahmed |
| 2019/0042988 A1 | 2/2019 | Brown et al. |
| 2019/0050726 A1 | 2/2019 | Azaria et al. |
| 2019/0122096 A1 | 4/2019 | Husain |
| 2019/0122140 A1 | 4/2019 | Sen |
| 2019/0171187 A1 | 6/2019 | Cella et al. |
| 2019/0171929 A1 | 6/2019 | Abadi et al. |
| 2019/0197410 A1 | 6/2019 | Berry II |
| 2019/0228300 A1 | 7/2019 | Cao et al. |
| 2019/0244348 A1 | 8/2019 | Buckler et al. |
| 2019/0286074 A1 | 9/2019 | Hoffman |
| 2019/0304568 A1 | 10/2019 | Wei et al. |
| 2019/0312898 A1 | 10/2019 | Verma et al. |
| 2019/0335192 A1 | 10/2019 | Otto et al. |
| 2019/0354846 A1 | 11/2019 | Mellempudi et al. |
| 2019/0370647 A1 | 12/2019 | Doshi et al. |
| 2019/0377976 A1 | 12/2019 | Markram et al. |
| 2019/0377999 A1 | 12/2019 | Markram et al. |
| 2019/0378000 A1 | 12/2019 | Markram et al. |
| 2019/0378007 A1 | 12/2019 | Markram et al. |
| 2019/0378008 A1 | 12/2019 | Markram et al. |
| 2019/0392303 A1 | 12/2019 | Cherubini et al. |
| 2020/0012927 A1 | 1/2020 | Raichelgauz et al. |
| 2020/0126126 A1 | 4/2020 | Briancon et al. |
| 2020/0134016 A1 | 4/2020 | Cao et al. |
| 2020/0184055 A1 | 6/2020 | Storm et al. |
| 2020/0285944 A1 | 9/2020 | Lee et al. |
| 2020/0302297 A1 | 9/2020 | Jaganathan et al. |
| 2020/0304284 A1 | 9/2020 | Markram et al. |
| 2020/0304285 A1 | 9/2020 | Hess et al. |
| 2020/0310400 A1 | 10/2020 | Jha et al. |
| 2020/0367810 A1 | 11/2020 | Shouldice et al. |
| 2020/0380335 A1 | 12/2020 | Neznal |
| 2020/0402497 A1 | 12/2020 | Semonov et al. |
| 2021/0049441 A1 | 2/2021 | Bronstein |
| 2021/0049446 A1 | 2/2021 | Gurumurthi et al. |
| 2021/0058547 A1 | 2/2021 | Puttamalla et al. |
| 2021/0097578 A1 | 4/2021 | Holmes et al. |
| 2021/0110115 A1 | 4/2021 | Hermann et al. |
| 2021/0182604 A1 | 6/2021 | Anthony et al. |
| 2021/0182653 A1 | 6/2021 | Markram et al. |
| 2021/0182654 A1 | 6/2021 | Markram et al. |
| 2021/0182655 A1 | 6/2021 | Markram et al. |
| 2021/0182657 A1 | 6/2021 | Markram et al. |
| 2021/0182681 A1 | 6/2021 | Markram et al. |
| 2021/0271319 A1 | 9/2021 | Lussier et al. |
| 2021/0338007 A1 | 11/2021 | Choi et al. |
| 2021/0398621 A1 | 12/2021 | Stojevic et al. |
| 2022/0005332 A1 | 1/2022 | Metzler et al. |
| 2022/0012877 A1 | 1/2022 | Buckler et al. |
| 2022/0147760 A1 | 5/2022 | Dutta et al. |
| 2022/0148454 A1 | 5/2022 | Jaramaz et al. |
| 2022/0157436 A1 | 5/2022 | Harley et al. |
| 2022/0187847 A1 | 6/2022 | Cella et al. |
| 2022/0197306 A1 | 6/2022 | Cella et al. |
| 2022/0261593 A1 | 8/2022 | Yu et al. |
| 2022/0269346 A1 | 8/2022 | Hussami et al. |
| 2023/0024925 A1 | 1/2023 | Markram et al. |
| 2023/0028511 A1 | 1/2023 | Markrani et al. |

FOREIGN PATENT DOCUMENTS

| | | | |
|---|---|---|---|
| CN | 107844830 | 3/2018 | |
| CN | 112567387 | 3/2021 | |
| CN | 112567388 | 3/2021 | |
| CN | 112567389 | 3/2021 | |
| CN | 112567390 | 3/2021 | |
| CN | 112585621 | 3/2021 | |
| EP | 1283496 A2 * | 2/2003 | ............. G06N 3/082 |
| EP | 3340121 | 6/2018 | |
| EP | 3803699 | 4/2021 | |
| EP | 3803705 | 4/2021 | |
| EP | 3803706 | 4/2021 | |
| EP | 3803707 | 4/2021 | |
| EP | 3803708 | 4/2021 | |
| KR | 20210008417 | 1/2021 | |
| KR | 20210008418 | 1/2021 | |
| KR | 20210008419 | 1/2021 | |
| KR | 20210008858 | 1/2021 | |
| KR | 20210010894 | 1/2021 | |
| TW | 201437945 | 10/2014 | |
| TW | 201535277 | 9/2015 | |
| TW | 201725519 | 7/2017 | |
| TW | I608429 | 12/2017 | |
| TW | 201928789 | 7/2019 | |
| TW | 201935326 | 9/2019 | |
| TW | 201937392 | 9/2019 | |
| WO | WO 2007/137047 | 11/2007 | |
| WO | WO 2016/206765 | 12/2016 | |
| WO | WO-2017083399 A2 * | 5/2017 | ............. G06N 3/084 |
| WO | WO 2017/197375 | 11/2017 | |
| WO | WO 2018/175400 | 9/2018 | |
| WO | WO 2019/238483 | 12/2019 | |
| WO | WO 2019/238512 | 12/2019 | |
| WO | WO 2019/238513 | 12/2019 | |
| WO | WO 2019/238522 | 12/2019 | |
| WO | WO 2019/238523 | 12/2019 | |
| WO | WO 2020/187676 | 9/2020 | |
| WO | WO 2020/187694 | 9/2020 | |
| WO | WO 2021/116071 | 6/2021 | |
| WO | WO 2021/116075 | 6/2021 | |
| WO | WO 2021/116140 | 6/2021 | |
| WO | WO 2021/116147 | 6/2021 | |
| WO | WO 2021/116250 | 6/2021 | |
| WO | WO 2021/116379 | 6/2021 | |
| WO | WO 2021/116402 | 6/2021 | |

(56) References Cited

FOREIGN PATENT DOCUMENTS

| WO | WO 2021/116404 | 6/2021 |
|---|---|---|
| WO | WO 2021/116407 | 6/2021 |

OTHER PUBLICATIONS

Title: Algorithms and data structures in computational topology Author: Clement Maria Date: Oct. 28, 2014 (Year: 2014).*
Overlapping Clusters for Distributed Computation (Anderson) taken from https://www.researchgate.net/publication/221520009_Overlapping_clusters_for_distributed_computation (Year: 2012).*
Algorithms and Data Structures in Computational Topology (Maria) taken from https://tel.archives-ouvertes.fr/tel-01123744/document (Year: 2014).*
"Adjacency Matrix" (Wolfram), retrieved via Internet Archive on Mar. 11, 2016, retrieved from <https://web.archive.org/web/20160311204902/https://mathworld.wolfram.com/AdjacencyMatrix.html> (Year: 2016).*
Subgraph Matching Using Graph Neural Network (Baslararaka) taken from https://file.scirp.org/pdf/JILSA20120400004_21355126.pdf (Year: 2012).*
Dropout: A Simple Way to Prevent Neural Networks from Overfitting (Srivastava) retrieved from https://jmlr.org/papers/volume15/srivastava14a/srivastava14a.pdf (Year: 2014).*
Bauer et al., "Clear and Compress: Computing Persistent Homology in Chunks," *Topological Methods in Data Analysis and Visualization III.*, pp. 103-117, 2014.
Bauer et al., "PHAT (Persistent Homology Algorithm Toolbox), v1.5," Copyright 2013-2017 IST Austria, Retrieved Jul. 23, 2018, Retrieved from URL<http://pub.ist.ac.at/~reininghaus/documents/phat.pdf>, 2 pages.
Cormen et al., "Introduction to Algorithms," Copyright 2001 by The Massachusetts Institute of Technology, 984 pages.
Dlotko et al., "Topological analysis of the connectome of digital reconstructions of neural microcircuits," 28 pages.
Erdos and Renyi., "On random graphs, I," *Math Debrecen.*, 6:290-297, 1959.
Hatcher., Algebraic Topology, Cambridge University Press, Feb. 2002, 556 pages.
Kahle, "Sharp vanishing thresholds for cohomology of random flag complexes," *Ann. Of Math.*, 179(3):1085-1107, 2014.
Markram, et al., "Reconstruction and simulation of neocortical microcircuitry," *Cell.*, 163(2):456-492, 2015.
Milo et al., "Network Motifs: Simple Building Blocks of Complex Networks," *Science.*, 298(5594):824-827, Oct. 25, 2002.
Pedregosa et al., "Scikit-learn: Machine learning in Python," *J Machine Learning Research.*, 12:2825-2830, 2011.
Peters et al., "The projection of the lateral geniculate nucleus to area 17 of the rat cerebral cortex. I. General description," *J Neurocytol.*, 5(1):63-84, Feb. 1976.
Peters et al., "The projection of the lateral geniculate nucleus to area 17 of the rat cerebral cortex. V. Degenerating axon terminals synapsing with Golgi impregnated neurons," *J Neurocytol.*, 8:331-357, 1979.
Ramaswamy et al., "The neocortical microcircuit collaboration portal: a resource for rat somatosensory cortex," *Frontiers in Neural Circuits.*, 9(Article 44), Oct. 8, 2015, 14 pages.
Reimann et al., "An algorithm to predict the connectome of neural microcircuits," *Front Comput Neurosci.*, 9(120), Oct. 8, 2015, 18 pages.
Abbas et al., "Artificial Intelligence Conquering the next frontier of the digital world," Research Gate, Dec. 17, 2017, 15 pages.
Aharoni et al. "Eigenvalues and homology of flag complexes and vector representations of graphs," Geom. Funct. Anal., Jul. 28, 2005, 15:555-566.
Alaniz, "Machiavellian Playbook for Artificial General Intelligence (AGI), Early Doctrine for AGI power," Research Gate, Aug. 2018, pp. 1-42.
Alaniz, "Remaking Einstein with a Dynamical Graph Rich Person Object Avatar Extraction Markup Language (intelligence as topological algebraic invariants, graph entropies, and dynamics)," Mar. 16, 2019, 14 pages.
Allswede et al., "Prenatal inflammation and risk for schizophrenia: A role for immune proteins in neurodevelopment," Development and Psychopathology, Aug. 2, 2018, 30: 1157-1178.
Angeli, "Symmetric functions for fast image retrieval with persistent homology," Math Meth Appl Sci., Apr. 24, 2018, 41:9567-9577.
Antonopoulos et al., "Evaluating performance of neural codes in neural communication networks," Neural Networks, Sep. 24, 2018, pp. 1-17.
Bahraini et al., "Topological pattern selection in recurrent networks," Neural Networks, Feb. 9, 2012, 31:22-32.
Baker et al., "Designing neural network architectures using reinforcement learning," arXiv preprint, arXiv:1611.02167, Nov. 7, 2016, 18 pages.
Bale et al., "Efficient population coding of naturalistic whisker motion in the ventro-posterior medial thalamus based on precise spike timing," Front. Neural Circuits, Sep. 25, 2015, 9: 1-14.
Baptiste-Bardin et al., "Topological exploration of artificial neuronal network dynamics," Network Neuroscience, Jan. 24, 2019, pp. 1-28.
Basset et al., "Network models in neuroscience," arXiv, Jul. 21, 2018, pp. 1-12.
Basset et al., "On the nature and use of models in network neuroscience," Nature Reviews, Jul. 12, 2018, 19:566-578.
Bassett et al., "Network Neuroscience," Network Neuroscience, Nat. Neurosci., Mar. 20, 2017, 20:353-364.
Baudot et al., "Topological Information Data Analysis," Entropy, Sep. 2019, 21:1-38.
Bergomi et al., "Topological Graph persistence," Mathematics, Jul. 20, 2017, pp. 1-15.
Betzel, "Stability of spontaneous, correlated activity in mouse auditory cortex," PLOS: Computational Biology, Dec. 9, 2019, 1-25.
Bianconi et al., "Topological percolation on hyperbolic simplicial complexes," Phys. Rev. E, Nov. 21, 2018, 5:1-18.
Bienenstock et al., "A model of neocortex," Network Comput. Neural Syst., Jul. 27, 1994, 6:179-224.
Blanco et al., "A genetic algorithm to obtain the optimal recurrent neural network," International Journal of Approximate Reasoning, Jan. 2000, 23(1):67-83.
Brody et al., "Correlations without synchrony," Neural Comput. 11, Oct. 1, 1999, 11:1537-1551.
Bullmore et al., "Complex brain networks: graph theoretical analysis of structural and functional systems," Nat. Rev. Neurosci., Mar. 10, 2009, 10:186-198.
Busch et al., "Intrinsic temporal tuning of neurons in the optic tectum is shaped by multisensory experience," Journal of Neurophysiology, Sep. 5, 2019, pp. 1-23.
Chacholski et al., "On the topology of complexes of injective words," Journal of Applied and Computational Topology, Aug. 16, 2019, 21:1-16.
Chambers et al., "Higher-order synaptic interactions coordinate dynamics in recurrent networks," PLoS computational biology, Aug. 19, 2016, 12(8):e1005078, 23 pages.
Chella et al., "Representational Issues in the Debate on the Standard Model of the Mind," Association for the Advancement of Artificial Intelligence, Nov. 12, 2017, pp. 1-6.
Chklovskii et al., "Cortical rewiring and information storage," Nature, Oct. 14, 2004, 431:782-788.
Choi et al., "A Survey of Binary Similarity and distance measures," Systemic, Cybernetics, and Informatics, Jan. 8, 2010, 8:43-48.
Choudhary, "Approximation algorithms for Vietoris-Rips and Čech filtrations," Doctoral Thesis of Computer Science, Faculty of Mathematics and Computer Science, Heidelberg University, Dec. 14, 2017, 140 pages.
Chowdhury et al., "Path homologies of deep feedforward networks," Arxiv, Oct. 16, 2019, pp. 1-6.
Coggan et al., "A Process for Digitizing and Simulating Biologically Realistic Oligocellular Networks Demonstrated for the Neuro-Glio-Vascular Ensemble," Neurosci, Sep. 25, 2018, 12:1-21.

(56) References Cited

OTHER PUBLICATIONS

Collins, "The case for emulating insect brains using anatomical "wiring diagrams" equipped with biophysical models of neuronal activity," Biological cybernetics, Dec. 1, 2019, 113:465-75.
Courtney et al., "Dense Power-law Networks and Simplicial Complexes," ArXiv, Apr. 23, 2018, pp. 1-16.
Crawford et al., "A theory on the role of π-electrons of docosahexaenoic acid in brain function: The six methylene-interrupted double bonds and the precision of neural signaling," Oilseeds & fats Crops and Lipids, May 21, 2018, pp. 1-14.
Curto, "Relating network connectivity to dynamics: opportunities and challenges for theoretical neuroscience," Current Opinion in Neurobiology, Oct. 1, 2019, 58:11-20.
Davydov et al., "Neural Network Structures: Current and Future States," Research Gate, Feb. 2, 2018, pp. 1-6.
Doborjeh et al.,"Spiking Neural Network Modelling Approach Reveals How Mindfulness Training Rewires the Brain," Scientific Reports, Apr. 23, 2019, 9:1-15.
Ebli, "A Notion of Harmonic Clustering in Simplicial Complexes," Laboratory for Topology and Neuroscience, École Polytechnique Fédérale de Lausanne, 1015 Lausanne, Switzerland, Oct. 17, 2019, 9 pages.
Engel et al., "Temporal binding and the neural correlates of sensory awareness," Trends Cogn. Sci., Jan. 1, 2001, 5:16-25.
EP Extended European Search Report in EP Appln. No. 17174314.9, dated Dec. 14, 2017, 11 pages.
Erdős et al., "On the evolution of random graphs," Publ. Math. Inst. Hung. Acad. Sci., Jan. 1960, pp. 17-60.
Fan et al., "A Brief History of Simulation Neuroscience," Front. Neuroinform., May 7, 2019, 13:1-28.
Feldbrugge et al., "Stochastic homology of Gaussian vs. non-Gaussian random fields: graphs towards Betti numbers and persistence diagrams," Journal of Cosmology and Astroparticle Physics, Sep. 24, 2019, 49 pages.
Feng et al., "Persistent Homology of Geospatial Data: A Case Study with Voting," Jan. 30, 2019, pp. 1-29.
Garcia et al., "Reconfigurations within resonating communities of brain regions following TMS reveal different scales of processing," BioRxiv, Jan. 9, 2020, pp. 1-39.
Garcia et al., "Unsupervised classification of neural spikes with a hybrid multilayer artificial neural network," Journal of Neuroscience Methods, 1998, 82:59-73.
Github.com [online] "pytorch-tutorial/tutorials/03-advanced/image_captioning/," Oct. 2007, retrieved on Jan. 21, 2020, retrieved from UR: <https://github.com/yunjey/pytorch-tutorial/tree/master/tutorials/03-advanced/image_captioning>, 3 pages.
Giusti et al., "Clique topology reveals intrinsic geometric structure in neural correlations," Proc. Natl. Acad. Sci. U.S.A., Apr. 28, 2015, 112:13455-13460.
Giusti et al., "Two's company, three (or more) is a simplex," Journal of computational neuroscience, Aug. 2016, 41(1):1-14.
Gong, "Evolution to a small-world network with chaotic units," Europhysics Letters (EPL), Jul. 15, 2004, 67:328-333.
Graves, "Adaptive computation time for recurrent neural networks," arXiv preprint arXiv: 1603.08983, Mar. 29, 2016, 19 pages.
Gros et al., "Semantic learning in autonomously active recurrent neural networks," Logic Journal of IGPL, Oct. 1, 2010, 18(5):686-704.
Gros, "Cognitive computation with autonomously active neural networks: an emerging field," Cognitive Computation, Mar. 2009, 1(1):77-90.
Gros, "Neural networks with transient state dynamics," New Journal of Physics, Apr. 30, 2007, 9(4):109, 21 pages.
Gros, "Self-sustained thought processes in a dense associative network," In Annual Conference on Artificial Intelligence, Sep. 11, 2005, Springer, Berlin, Heidelberg, 14 pages.
Guerreiro et al., "A Neural Key Generator for a Public Block Cipher," IEEE Ninth Brazilian Symposium on Neural Networks (SBRN '06), Oct. 23-27, 2006, Ribeirao Preto, BR, 143-147.
Guerreno, "The sleep onset transition: a connectivity investigation built on EEG source localization," University of Zurich, Facult of Science, Aug. 6, 2018, pp. 1-292.
Harris et al. "The neocortical circuit: themes and variations," Nat. Neurosci., Jan. 27, 2015, 18:170-181.
Hastings et al., "Challenges in the analysis of complex systems: introduction and overview," The European Physical Journal Special Topics, Dec. 28, 2017, 226:3185-3197.
Haun et al., "Conscious Perception as Integrated Information Patterns in Human Electrocorticography," eNeuro: Cognition and Behavior, Sep. 19, 2017, 4:2-18.
Hebb, "The Organization of Behavior: A Neuropsychological Theory," New York, NY:Wiley & Sons, 1949, pp. 1-365.
Hoan Tran et al., "Scale-variant topological information for characterizing the structure of complex networks," Physical Review E, Sep. 18, 2019, 100:1-18.
Holtmaat et al., "Experience-dependent structural synaptic plasticity in the mammalian brain," Nat. Rev. Neurosci., Sep. 10, 2009, 10: 647-658.
Hu et al., "Local paths to global coherence: cutting networks down to size," Phys. Rev. E, Mar. 10, 2014, 89: 1-16.
Ibanze-Marcelo et al., "Topology highlights mesoscopic functional equivalence between imagery and perception: The case of hypnotizability," NeuroImage, Jun. 19, 2019, 437-449.
Ignacio et al., "Classification of Single-lead Electrocardiograms: TDA Informed Machine Learning," ArXiv, Nov. 25, 2019, pp. 1-6.
Ignacio et al., "Tracing patterns and shapes in remittance and migration networks via persistent homology," EPJ Data Science, Jan. 5, 2019, 8:1-25.
International Preliminary Report on Patentability in International Appln. No. PCT/EP2020/056588, dated Sep. 30, 2021, 8 pages.
International Preliminary Report on Patentability in International Appln. No. PCT/EP2019/064593, dated Dec. 24, 2020, 11 pages.
International Preliminary Report on Patentability in International Appln. No. PCT/EP2019/064740, dated Dec. 24, 2020, 11 pages.
International Preliminary Report on Patentability in International Appln. No. PCT/EP2019/064741, dated Dec. 24, 2020, 9 pages.
International Preliminary Report on Patentability in International Appln. No. PCT/EP2019/064773, dated Dec. 24, 2020, 11 pages.
International Preliminary Report on Patentability in International Appln. No. PCT/EP2019/064776, dated Dec. 24, 2020, 11 pages.
International Preliminary Report on Patentability in International Appln. No. PCT/EP2020/056686, dated Sep. 30, 2021, 10 pages.
International Search Report and Written Opinion in International Appln. No. PCT/EP2019/064593, dated Sep. 6, 2019, 18 pages.
International Search Report and Written Opinion in International Appln. No. PCT/EP2019/064740, dated Sep. 6, 2019, 18 pages.
International Search Report and Written Opinion in International Appln. No. PCT/EP2019/064741, dated Sep. 6, 2019, 16 pages.
International Search Report and Written Opinion in International Appln. No. PCT/EP2019/064773, dated Sep. 6, 2019, 17 pages.
International Search Report and Written Opinion in International Appln. No. PCT/EP2019/064776, dated Sep. 6, 2019, 17 pages.
International Search Report and Written Opinion in International Appln. No. PCT/EP2020/056588, dated May 26, 2020, 12 pages.
International Search Report and Written Opinion in International Appln. No. PCT/EP2020/056686, dated May 26, 2020, 13 pages.
International Search Report and Written Opinion in International Appln. No. PCT/EP2020/085007, dated Mar. 24, 2021, 10 pages.
International Search Report and Written Opinion in International Appln. No. PCT/EP2020/085016, dated Mar. 24, 2021, 18 pages.
International Search Report and Written Opinion in International Appln. No. PCT/EP2020/085169, dated Mar. 18, 2021, 15 pages.
International Search Report and Written Opinion in International Appln. No. PCT/EP2020/085200, dated Apr. 9, 2021, 15 pages.
International Search Report and Written Opinion in International Appln. No. PCT/EP2020/085434, dated Mar. 24, 2021, 16 pages.
Ivancevic et al., "Tensor-Centric Warfare II: Entropic Uncertainty Modeling," Intelligent Control and Automation, May 30, 2018, 9:30-51.
Ivancevic et al., "Tensor-Centric Warfare V: Topology of Systems Confrontation," Intelligent Control Automation, Feb. 28, 2019, 10:13-45.

(56) References Cited

OTHER PUBLICATIONS

Judge, "Prefix "Re-Cognition" as prelude to fixing sustainability—"pro" vs. "con"? Speculative review of missing emphasis potentially vital for psychosocial balance," Research Gate, Jul. 16, 2017, pp. 1-22.
Kanari et al., "A Topological Representation of Branching Neuronal Morphologies," Neuroinformatics, Oct. 3, 2017, 11 pages.
Kanari et al., "Quantifying topological invariants of neuronal morphologies," ArXiv, Mar. 28, 2016, 15 pages.
Kartun-Giles, "Beyond the clustering coefficient: A topological analysis of node neighborhoods in complex networks," Chaos, Solitons & Fractals: X, Feb. 16, 2019, 1:1-12.
Kastanenka et al., "A roadmap to integrate astrocytes into Systems Neuroscience," Gila, Wiley Periodicals, Apr. 9, 2019, pp. 1-22.
Khajezade et al., "A Game-Theoretical Network Formation Model for C. elegans Neural Network," Frontiers in Computational Neuroscience, Jul. 9, 2019, 13:1-12.
Knoblauch et al., "Memory capacities for synaptic and structural plasticity," Neural Comput., Feb. 2010, 22:289-341.
Kulakov, "Features of a Simple Psychophysiological Reaction," Human Physiology, Jun. 15, 2017, 44:412-417.
Kumarashinghe, "Deep learning and deep knowledge representation in Spiking Neural Networks for Brain-Computer Interface," Neural Networks, Sep. 20, 2019, 121:169-185.
Kumbhar et al., "CoreNeuron: An Optimized Compute Engine for the Neuron Simulator," Frontiers in Neuroinformatics, Sep. 4, 2019, pp. 1-27.
Kvam, "A geometric framework for modeling dynamic decisions among arbitrarily many alternatives," Journal of Mathematical Psychology, Aug. 1, 2019, 91:14-37.
Latora et al., "Efficient behavior of small-world networks," Phys. Rev. Lett., Oct. 17, 2001, 87:1-4.
Le Be et al., "Spontaneous and evoked synaptic rewiring in the neonatal neocortex," Proc. Natl. Acad. Sci. U.S.A., Aug. 29, 2006 103:13214-13219.
Lee et al., "Detecting highly overlapping community structure by greedy clique expansion," arXiv preprint arXiv:1002.1827, Feb. 9, 2010, 10 pages.
Lena et al., "Deep spatio-temporal architectures and learning for protein structure prediction," Advances in neural information processing systems, 2012, 25, 9 pages.
Levi, "A short course on Algebraic topology geared towards applications to Neuroscience," University of Aberdeen, Jul. 18, 2017, pp. 1-14.
Li et al., "Ternary weight networks," arXiv preprint arXiv:1605.04711, May 16, 2016, 5 pages.
Lin et al., "Organizing principles of real-time memory encoding: neural clique assemblies and universal neural codes," Trends in Neurosciences, Jan. 2006, 29(1):48-57.
Luccioli et al., "Modeling driver cells in developing neural networks," PLOS Computational Biology, Nov. 2, 2018, pp. 1-31.
Luczak et al., "Packetbased communication in the cortex," Nat. Rev. Neurosci., Oct. 28, 2015, 16:745-755.
Lutgehetmann et al., "Computing Persistent Homology of Directed Flag Complexes," Algorithms, Jan. 7, 2020, 1:1-18.
Lynn et al., "The physics of brain network structure, function, and control," Nature Reviews, May 27, 2019, 1:318-332.
Mardones, "Persistence Steemod modules," ArXiv Mathematics, Dec. 12, 2018, pp. 1-10.
Masulli et al., "Dynamics of evolving feed-forward neural networks and their topological invariants," Network and Parallel Computing, Aug. 13, 2016, pp. 99-106.
Masulli et al., "The topology of the directed clique complex as a network invariant," SpringerPlus, Dec. 2016, 5(1):1-2.
McCoss, "Agency of Life, Entropic Gravity and Phenomena Attributed to Dark Matter," Journal of Quantum Information Science, Jun. 15, 2017, 7:67-75.
McCoss, "Lithium Quantum Consciousness," Journal of Quantum Information Science, Nov. 8, 2017, 7:125-139.
Mehta, "Storing and retrieving long-term memories: cooperation and competition in synaptic dynamics," Advances in Physics: X, Jul. 19, 2018, 3:756-790.
Meyer et al., "Cell type-specific thalamic innervation in a column of rat vibrissal cortex," Cereb. Cortex, Jun. 9, 2010, 20: 2287-2303.
Millán et al., "Complex Network Geometry and Frustrated Synchronization," Scientific Reports, Jul. 2, 2018, 8:1-10.
Millan Vidal et al., "Synchronization in network geometries with finite spectral dimension," ArXiv, Jan. 31, 2019, pp. 1-15.
Miller et al., "Visual stimuli recruit intrinsically generated cortical ensembles," Proc. Natl. Acad. Sci. U.S.A., Sep. 8, 2014, pp. E4053-E4061.
Miura et al., "Sparse Parallel Algorithms for Recognizing Touch Topology on Curved Interactive Screens," IEEE Access, Jul. 31, 2017, 5:14889-14897.
Muller et al., "Neocortical plasticity: an unsupervised cake but no free lunch," 33rd Conference on Neural Information Processing Systems, Vancouver, Canada, Nov. 2019, 6 pages.
Munkres, "Elements of Algebraic Topology," Massachusetts Institute of Technology, 1984, Addison-Wesley Publishing Company, 233 pages.
Nolte, "Cortical reliability amid noise and chaos," Nature Communications, Aug. 22, 2019, 10:1-15.
Norton, "Dynamics of Reaction-Diffusion Oscillators in Star and other Networks with Cyclic Symmetries Exhibiting Multiple Clusters," Physical Review Letters, Oct. 4, 2019, 123: 1-6.
Opris et al., "What Is the Evidence for Inter-laminar Integration in a Prefrontal Cortical Minicolumn?," Frontiers in Neuroanatomy, Dec. 14, 2017, 11: 1-11.
Pajevic et al., "The organization of strong links in complex networks," Nat. Phys., Mar. 11, 2012, 8:429-436.
Palm et al., "On the significance of correlations among neuronal spike trains," Biol. Cybern., Jun. 1, 1988, 59:1-11.
Park et al., "CNN (Convolutional Neural Network) based in-loop filter in HEVC," In Proceedings of the Korean Society of Broadcast Engineers Conference 2016, The Korean Institute of Broadcast and Media Engineers, 2016, pp. 369-372 (with English Abstract).
Patel et al., "Generative Design of Electromagnetic Structures Through Bayesian Learning," IEEE Transactions on Magnetics, Oct. 20, 2017, 54:1-4.
Paugam-Moisy et al., "Delay learning and polychronization for reservoir computing," Neurocomputing, Feb. 1, 2008, 71:1143-1158.
Peng, "High-throughput microcircuit analysis of individual human brains through next-generation multineuron patch-clamp," BioRxiv, Jan. 1, 2019, pp. 1-49.
Perin et al., "A synaptic organizing principle for cortical neuronal groups," Proc. Natl. Acad. Sci. U.S.A., Mar. 29, 2011, 108:5419-5424.
Petlevski, "Modeling the Model: the World Beyond the Immediate Sensorium," Proceedings of the 20th International Multiconference Information Society, Oct. 18, 2017, pp. 44-47.
Petri et al., "Homological scaffolds of brain functional networks," J. R. Soc. Interface, Dec. 6, 2014, 1:1-11.
Petri et al., "Simplicial Activity Driven Model," Phys. Rev. Lett, Nov. 29, 2018, 121:1-5.
Planas et al., "Accelerating Data Analysis in Simulation Neuroscience with Big Data Technologies," International Conference on Computational Science, Jun. 1, 2018, pp. 363-377.
Popa, "Psychology 2.0: The Emergence of Individuality," Sep. 2019, pp. 1-6.
Prentner, "Consciousness and Topologically Structured Phenomenal Spaces," Consciousness and Cognition, Feb. 26, 2019, 70:25-38.
Reimann et al., "Cliques of Neurons Bound into Cavities Provide a Missing Link between Structure and Function," Frontiers in Computational Neuroscience, Jun. 12, 2017, 11:1-16.
Renart et al., "The asynchronous state in cortical circuits," Science 327, Jan. 29, 2010, 587-590.
Rosenbaum et al., "The spatial stmcture of correlated neuronal variability," Nat. Neurosci., Oct. 21, 2016, 20:107-114.
Salnikov, et al., "Simplicial complexes and complex systems," European Journal of Physics, Nov. 14, 2018, 40(1):014001.

(56) References Cited

OTHER PUBLICATIONS

Santos et al., "Topological phase transitions in functional brain networks," Physical Review E, Sep. 30, 2019, 100: 1-17.
Saucan et al., "Forman's Ricci Curvature—From Networks to Hypernetworks,"vol. 1, Proceedings The 7th International Conference on Complex Networks and Their Applications, ArXiv, Oct. 17, 2018, 13 pages.
Schoenberg et al., "Mapping Meditative States and Stages with Electrophysiology: Concepts, Classifications, and Methods," Current Opinion in Psychology, Oct. 18, 2018, 28:211-217.
SciPy.org [online],"SciPy: Open Source Scientific Tools for Python," available on or before Mar. 9, 2001, via Internet Achieve: Wayback Machine URL <https://web.archive.org/web/20010309040805/http://www.scipy.org/>, retrieved on Jan. 17, 2020, <https://www.scipy.org/citing.html>.
See et al., "Coordinated neuronal ensembles in primary auditory cortical columns," Elife Sciences, Jun. 5, 2018, pp. 1-33.
Shepherd et al., "Geometric and functional organization of cortical circuits," Nat. Neurosci., May 8, 2005, 8:782-790.
Sizemore et al., "The importance of the whole: Topological data analysis for the network neuroscientist," Network Neuroscience, Oct. 17, 2018 3:1-18.
Sizemore et al., "Cliques and cavities in the human connectome," Journal of computational neuroscience, Feb. 2018, 44(1):115-145.
Skardal et al., "Abrupt Desynchronization and Extensive Multistability in Globally Coupled Oscillator Simplexes," Physical Review Letters 122, Jun. 19, 2019, pp. 1-6.
Song et al. "Highly nomandom features Of synaptic connectivity in local cortical circuits," PLoS Biol., Mar. 1, 2005, 3:0507-0519.
Stepanyants et al., "Neurogeometry and potential synaptic connectivity," Trends in Neurosci., Jun. 2, 2005, 28:387-394.
Suarez, "The interaction between task goals and the representation of choice options in decision-making," Thesis for the degree of Doctor of Philosophy, University College of London, Sep. 2017, pp. 1-176.
Sun et al., "Runtime detection of activated polychromous neuronal group towards its spatiotemporal analysis," 2015 International Joint Conference on Neural Networks, Jul. 12-17, 2015, 1-8.
Timsit et al., "Nervous-Like Circuits in the Ribosome Facts, Hypotheses and Perspectives," Int. J. Mol. Sci, Jun. 14, 2019, 20:1-22.
Tozzi et al., "Brain Projective Reality: Novel Clothes for the Emperor, Reply to comments of Topodynamics of metastable brains," Physics of Life Reviews, Jun. 28, 2017, pp. 1-11.
Turner, "Rips filtrations for quasimetric spaces and asymmetric functions with stability results," Algebraic & Geometric Topology, May 21, 2019, 19:1135-1170.
TW Office Action in Taiwanese Appln. No. 108119813, dated Jun. 29, 2020, 17 pages (with machine translation).
Tyukin et al., "High-Dimensional Brain: A Tool for Encoding and Rapid Learning of Memories by Single Neurons," Bull Math Biol., Mar. 19, 2018, 11:4856-4888.
Varshney et al., "Structural properties of the caenorhabditis elegans neuronal network," PLoS Comput. Biol,, Feb. 3, 2011, 7:1-22.
Velazquez et al., "On a Simple General Principle of Brain Organization," Frontiers in Neuroscience, Oct. 15, 2019, 13:1-16.
Wang et al., "Topological recurrent neural network for diffusion prediction," In2017 IEEE International Conference on Data Mining (ICDM), Nov. 18, 2017, pp. 475-484.
Wijaya et al., "Finding an appropriate equation to measure similarity between binary vectors: case studies on Indonesian and Japanese herbal medicines," BMC bioinformatics, Dec. 2016,17:1-19.
Willshaw et al., "Nonholographic associative memory," Nature 222, Jun. 7, 1969, pp. 960-963.
Woodward et al., "A Reservoir Computing approach to Image Classification using Coupled Echo State and Back-Propagation Neural Networks," International conference image and vision computing, Auckland, New Zealand, Nov. 29, 2011, 6 pages.
Yang et al., "Road detection and centerline extraction via deep recurrent convolutional neural network U-Net," IEEE Transactions on Geoscience and Remote Sensing, May 14, 2019, 57(9):7209-20.

Young, "Standard Laterality Models: Neo-Eriksonian Perspectives," Chapter 8, Causality and Development, Jan. 2019, pp. 147-179.
Cai et al., "Path-level network transformation for efficient architecture search," InInternational Conference on Machine Learning, Jul. 3, 2018 PMLR, 10 pages.
Ludemur et al., "An optimization methodology for neural network weights and architectures," IEEE Transactions on Neural Networks, Nov. 13, 2006, 17(6):1452-9.
Rawal et al., "From nodes to networks: Evolving recurrent neural networks," arXiv preprint arXiv:1803.04439, Mar. 12, 2018, 8 pages.
Bauer et al., "Real-time ultra-low power ECG anomaly detection using an event-driven neuromorphic processor," IEEE transactions on biomedical circuits and systems, Nov. 11, 2019, 13(6):1575-82.
Goodman et al., "Brian: a simulator for spiking neural networks in python," Frontiers in neuroinformatics, 2008:5, 10 pages.
International Preliminary Report on Patentability in International Appln. No. PCT/EP2020/085007, dated Jun. 23, 2022, 8 pages.
International Preliminary Report on Patentability in International Appln. No. PCT/EP2020/085016, dated Jun. 23, 2022, 11 pages.
International Preliminary Report on Patentability in International Appln. No. PCT/EP2020/085169, dated Jun. 23, 2022, 8 pages.
International Preliminary Report on Patentability in International Appln. No. PCT/EP2020/085200, dated Jun. 23, 2022, 9 pages.
International Preliminary Report on Patentability in International Appln. No. PCT/EP2020/085434, dated Jun. 23, 2022, 9 pages.
International Preliminary Report on Patentability in International Appln. No. PCT/EP2020/085716, dated Jun. 23, 2022, 11 pages.
International Search Report and Written Opinion in International Appln. No. PCT/EP2020/085716 , dated Mar. 25, 2021, 18 pages.
Minkovich et al. "Programming time-multiplexed reconfigurable hardware using a scalable neuromorphic compiler," IEEE transactions on neural networks and learning systems, Apr. 11, 2012, 23(6):889-901.
U.S. Appl. No. 16/004,635, filed Jun. 11, 2018, Markram.
U.S. Appl. No. 16/710,176, filed Dec. 11, 2019, Markram.
U.S. Appl. No. 17/783,961, filed Jun. 9, 2022, Markram.
TW Office Action in Taiwanese Appln. No. 10943863, dated Mar. 1, 2022, 13 pages (with machine translation).
U.S. Appl. No. 16/004,635, filed Jun. 11, 2018, Henry Markram.
U.S. Appl. No. 16/004,837, filed Jun. 11, 2018, Henry Markram.
U.S. Appl. No. 16/004,796, filed Jun. 11, 2018, Henry Markram.
U.S. Appl. No. 16/004,757, filed Jun. 11, 2018, Henry Markram.
U.S. Appl. No. 16/004,671, filed Jun. 11, 2018, Henry Markram.
U.S. Appl. No. 16/356,391, filed Mar. 18, 2019, Henry Markram.
U.S. Appl. No. 16/356,478, filed Mar. 18, 2019, Kathryn Hess.
U.S. Appl. No. 16/710,266, filed Dec. 11, 2019, Henry Markram.
U.S. Appl. No. 16/710,058, filed Dec. 11, 2019, Henry Markram.
U.S. Appl. No. 16/710,205, filed Dec. 11, 2019, Henry Markram.
U.S. Appl. No. 16/710,176, filed Dec. 11, 2019, Henry Markram.
U.S. Appl. No. 16/710,080, filed Dec. 11, 2019, Henry Markram.
Dlotko [online], "Directed clique topology" (slides are titled "Directed Complexes"), presented at BIRS workshop, video from 17w5043: Topological Methods in Brain Network Analysis, May 11, 2017, retrieved from < http://www.birs.ca/events/2017/5-day-workshops/17w5043/videos/watch/201705 111 127-Dlotko.html>, retrieved on Jul. 26, 2022, 26 pages.
Gripon et al., "Sparse Neural Networks with Large Learning Diversity," IEEE Transactions on Neural Networks, Jul. 2011, 22(7): 1087-1096.
International Search Report and Written Opinion in International Appln. No. PCT/EP2020/085716, dated Mar. 25, 2021, 13 pages.
Liang et al., "Interpretable Structure-Evolving LSTM," 2017 IEEE Conference on Computervision and Pattern Recognition (CVPR), 2017, pp. 2175-2184.
Yang et al., "Convolutional Neural Networks with Alternately Updated Clique," 2018 IEEE/CVF Conference on Computer Vision and Pattern Recognition, 2018, pp. 2413-2422.
Curto et al., "Cell groups reveal structure of stimulus space," Pios Comput. Biol., Oct. 2008, 4(10):e100205.
Curto, "What Can Topology Tell US About the Neural Code?," The American Mathematical Society, Jan. 2017, 54(1):63-78.

(56) References Cited

OTHER PUBLICATIONS

Dabaghian et al., "A topological paradigm for hippocampal spatial map formation using persistent homology," Plos Comput. Biol., Aug. 2012, 8(8):e1002581.
Dabaghian et al., "Reconceiving the hippocampal map as a topological template," Elife, Aug. 20, 2014, 3:e03476.
deCharms et al., "Primary cortical representation of sounds by the coordination of action-potential timing," Nature, Jun. 13, 1996, 381(6583):610-613.
Djurfeldt et al., "Efficient generation of connectivity in neuronal networks from simulator-independent descriptions," Frontiers in Neuroinformatics, Mar. 28, 2014, 8(43):1-11.
docs.opencv.org [online], "Camera Calibration and 3D Reconstruction," Apr. 14, 2020, retrieved on Oct. 5, 2022, retrieved from URL <https://docs.opencv.org/4.4.0/d9/d0c/group_calib3d.html#ga549c2075fac14829ff4a58bc931c033d)> , 78 pages.
docs.opencv.org [online], "Pose Estimation," available no later than Sep. 13, 2021, retrieved on Oct. 5, 2022, retrieved from URL <https://docs.opencv.org/4.x/d7/d53/tutorial_py_pose.html>, 3 pages.
Extended European Search Report in European Appln. No. 17174316.4, dated Dec. 14, 2017, 11 pages.
Extended European Search Report in European Appln. No. 17174317.2, dated Dec. 14, 2017, 11 pages.
Github.com [online], "facebookresearch/detectron2," 2019, retrieved on Oct. 5, 2022, retrieved from URL <https://github.com/facebookresearch/detectron2>, 4 pages.
Gleeson et al., "Open Source Brain: A Collaborative Resource for Visualizing, Analyzing, Simulating, and Developing Standardized Models of Neurons and Circuits," Neuron, Aug. 7, 2019, 103(3):395-411.e5.
International Preliminary Report on Patentability in International Appln. No. PCT/EP2020/085750, dated Jun. 23, 2022, 8 pages.
International Preliminary Report on Patentability in International Appln. No. PCT/EP2020/085754, dated Jun. 23, 2022, 12 pages.
International Preliminary Report on Patentability in International Appln. No. PCT/EP2020/085762, dated Jun. 23, 2022, 7 pages.
International Search Report and Written Opinion in International Appln. No. PCT/EP2020/085750, dated Apr. 6, 2021, 10 pages.
International Search Report and Written Opinion in International Appln. No. PCT/EP2020/085754, dated Apr. 6, 2021, 14 pages.
International Search Report and Written Opinion in International Appln. No. PCT/EP2020/085762, dated Apr. 6, 2021, 9 pages.
Jozefowicz et al., "An Empirical Exploration of Recurrent Network Architectures," Proceedings of the 32nd International Conference on Machine Learning, 2015, 37:1-9.
Office Action in Korean Appln. No. 2020/7035845, dated Feb. 16, 2022, 9 pages (with English translation).
Office Action in Korean Appln. No. 2020-7035843, dated Jan. 27, 2022, 9 pages (with English translation).
Office Action in Korean Appln. No. 2020-7035844, dated Feb. 17, 2022, 6 pages (with English translation).
Office Action in Korean Appln. No. 2020-7035846, dated Feb. 15, 2022, 6 pages (with English translation).
Office Action in Korean Appln. No. 2020-7035847, dated Aug. 10, 2022, 5 pages (with English translation).
Office Action in Korean Appln. No. 2020-7035847, dated Feb. 15, 2022, 11 pages (with English translation).
Office Action in Taiwanese Appln. No. 108119813, dated May 19, 2021, 8 pages (with machine translation).
Office Action in Taiwanese Appln. No. 109143238, dated Dec. 1, 2021, 18 pages (with machine translation).
Office Action in Taiwanese Appln. No. 109143239, dated Nov. 30, 2021, 22 pages (with machine translation).
Office Action in Taiwanese Appln. No. 109143240, dated Dec. 24, 2021, 13 pages (with machine translation).
Office Action in Taiwanese Appln. No. 109143242, dated Nov. 26, 2021, 24 pages (with machine translation).
Office Action in Taiwanese Appln. No. 109143863, dated Mar. 1, 2022, 11 pages (with machine translation).
Office Action in U.S. Appl. No. 16/004,635, dated Aug. 3, 2022, 24 pages.
Office Action in U.S. Appl. No. 16/004,635, dated Jun. 3, 2021, 44 pages.
Office Action in U.S. Appl. No. 16/004,635, dated Nov. 24, 2021, 34 pages.
Office Action in U.S. Appl. No. 16/004,671, dated May 26, 2022, 43 pages.
Office Action in U.S. Appl. No. 16/004,671, dated Nov. 17, 2021, 40 pages.
Office Action in U.S. Appl. No. 16/004,671, dated Oct. 27, 2022, 40 pages.
Office Action in U.S. Appl. No. 16/004,757, dated Dec. 20, 2021, 31 pages.
Office Action in U.S. Appl. No. 16/004,757, dated Jul. 14, 2022, 30 pages.
Office Action in U.S. Appl. No. 16/004,757, dated Jun. 8, 2021, 26 pages.
Office Action in U.S. Appl. No. 16/004,796, dated Apr. 8, 2021, 35 pages.
Office Action in U.S. Appl. No. 16/004,796, dated Aug. 4, 2022, 45 pages.
Office Action in U.S. Appl. No. 16/004,796, dated Sep. 16, 2021, 46 pages.
Office Action in U.S. Appl. No. 16/004,837, dated Jun. 6, 2022, 8 pages.
Office Action in U.S. Appl. No. 16/356,391, dated Mar. 8, 2022, 10 pages.
Office Action in U.S. Appl. No. 16/356,391, dated Nov. 9, 2021, 13 pages.
Office Action in U.S. Appl. No. 16/356,478, dated Mar. 3, 2022, 5 pages.
Office Action in U.S. Appl. No. 16/710,058, dated Sep. 9, 2022, 14 pages.
Office Action in U.S. Appl. No. 16/710,176, dated Jun. 9, 2022, 7 pages.
Office Action in U.S. Appl. No. 16/710,266, dated Nov. 17, 2022, 32 pages.
Office Action in U.S. Appl. No. 16/710,2056, dated Oct. 26, 2022, 51 pages.
Panda et al., "Learning to Recognize Actions from Limited Training Examples Using a Recurrent Spiking Neural Model", arXiv, Oct. 19, 2017, 17 pages.
Paredes-Valles et al., "Unsupervised Learning of a Hierarchical Spiking Neural Network for Optical Flow Estimation: From Events to Global Motion Perception," IEEE Transactions on Pattern Analysis and Machine Intelligence, Mar. 5, 2019, 42(8):2051-2064.
Wikipedia.org [online], "DBSCAN," Mar. 31, 2008, retrieved on Oct. 5, 2022, retrieved from URL <https://en.wikipedia.org/wiki/DBSCAN>, 8 pages.
Wikipedia.org [online], "Harris corner detector," Apr. 21, 2019, retrieved on Oct. 5, 2022, retrieved on Oct. 5, 2022, retrieved from URL <https://en.wikipedia.org/wiki/Harris_corner_detector>, 6 pages.
Wikipedia.org [online], "Optics algorithm," Jun. 12, 2010, retrieved Oct. 5, 2022, retrieved from URL <https://en.wikipedia.org/wiki/Optics_algorithm, 6 pages.
Wikipedia.org [online], "Scale-invariant feature transform," Apr. 15, 2005, retrieved on Oct. 5, 2022, retrieved from URL <https://en.wikipedia.org/wiki/Scale-invariant_feature_transform>, 19 pages.
Achard et al., "A Resilient, Low-Frequency, Small-World Human Brain Functional Network with Highly Connected Association Cortical Hubs," Journal of Neuroscience, Jan. 4, 2006, 26(1):63-72.
Arai et al., "The Effects of Theta Precession on Spatial Learning and Simplicial Complex Dynamics in a Topological Model of the Hippocampal Spatial Map," PLOS Computational Biology, Jun. 19, 2014, 10(6):r1003651.
Astrivis [online], "Demo Scan Church Dec. 2016," Dec. 2, 2016, retrieved on Nov. 27, 2022, retrieved from URL <https://www.youtube.com/watch?v=xCgQ4aaBlGo>, 2 pages [Video Submission].
Bassett et al., "Dynamic reconfiguration of human brain networks during learning," PNAS, Apr. 18, 2011, 108(18):7641-7646.

(56) References Cited

OTHER PUBLICATIONS

Brown et al., "Structure of the Afferent Terminals in Terminal Ganglion of a Cricket and Persistent Homology," PLOS One, May 23, 2012, 7(5):e37278.
Chen et al., "Neural Representation of Spatial Topology in the Rodent Hippocampus," Neural Computation, Jan. 2014, 26(1):1-39.
Choi et al., "Abnormal metabolic connectivity in the pilocarpine-induced epilepsy rat model: A multiscale network analysis based on persistent homology," NeuroImage, Oct. 1, 2014, 99:226-236.
Chung et al., "Persistence Diagrams of Cortical Surface Data," Information Processing in Medical Imaging, 2009, pp. 386-397.
Crossley et al., "Cognitive relevance of the community structure of the human brain functional coactivation network," PNAS, Jun. 24, 2013, 110(28):11583-11588.
Dongjiang et al., "DXSLAM: A Robust and Efficient Visual SLAM System with Deep Features," ArXiv, Aug. 12, 2020, 8 pages.
Drakesmith et al., "Overcoming the effects of false positives and threshold bias in graph theoretical analyses of neuroimaging data," NeuroImage, Sep. 2015, 118:313-333.
Ellis et al., "Describing High-Order Statistical Dependence Using "Concurrence Topology," With Application to Functional MRI Brain Data," Homology, Homotopy and Applications, 2014, 16(1):245-264.
Garrison et al., "The (in)stability of functional brain network measures across thresholds," NeuroImage, Sep. 2015, 118:651-661.
Ginestet et al., "Brain Network Analysis: Separating Cost from Topology Using Cost-Integration," PLOS One, Jul. 28, 2018, 2011, 6(7):e21570.
International Search Report and Written Opinion in International Appln. No. PCT/EP2022/073852, dated Dec. 9, 2022, 18 pages.
Khalid et al., "Tracing the evolution of multi-scale functional networks in a mouse model of depression using persistent brain network homology," NeuroImage, Nov. 1, 2014, 101:351-363.
Kim et al., Morphological brain network assessed using graph theory and network fdtration in deaf adults, Hearing Research, Sep. 2014, 315:88-98.
Langer et al., "The Problem of Thresholding in Small-World Network Analysis," PLOS One, Jan. 3, 2013, 8(1):e53199.
Lee et al., "Discriminative persistent homology of brain networks," 2011 IEEE International Symposium on Biomedical Imaging: From Nano to Macro, Mar. 30, 2011, pp. 841-844.
Lucky Robot [online], "Orb SLAM3: AR demo," Feb. 23, 2021, retrieved on Nov. 27, 2022, retrieved from URL <https://www.youtube.com/watch?v=c1ExX_IA5tM>, 2 pages [Video Submission].
Medaglia et al., "Cognitive Network Neuroscience," Journal of Cognitive Neuroscience, Aug. 1, 2015, 27(8):1471-1491.
Mur-Artal et al., "ORB-SLAM2: an Open-Source SLAM System for Monocular, Stereo and RGB-D Cameras," IEEE Transactions on Robotics, Oct. 5, 2015, 31(5):1147-1163.
Pirino et al., "A topological study of repetitive co-activation networks in in vitro cortical assemblies," Physical Biology, Jan. 5, 2015, 12(1):016007.
Singh et al., "Topological analysis of population activity in visual cortex," Journal of Vision, Jun. 2008, 8(8): 11, 18 pages.
Stolz, "Computational Topology in Neuroscience," Dissertation for the Degree of Master of Science in Mathematical Modelling & Scientific Computing at the University of Oxford, Sep. 2014, 77 pages.
Office Action in U.S. Appl. No. 16/004,635, dated Jan. 23, 2023, 24 pages.
U.S. Appl. No. 1 6/004,635, filed Jun. 11, 2017, Markram.
U.S. Appl. No. 16/004,837, filed Jun. 11, 2018, Markram.
U.S. Appl. No. 16/004,796, filed Jun. 11, 2018, Markram.
U.S. Appl. No. 16/004,757, filed Jun. 11, 2018, Markram.
U.S. Appl. No. 16/004,671, filed Jun. 11, 2018, Markram.
U.S. Appl. No. 16/356,391, filed Mar. 18, 2019, Markram.
U.S. Appl. No. 16/356,478, filed Mar. 18, 2019, Hess.
U.S. Appl. No. 16/710,266, filed Dec. 11, 2019, Markram.
U.S. Appl. No. 16/710,058, filed Dec. 11, 2019, Markram.
U.S. Appl. NO. 16/710,205, filed Dec. 11, 2019, Markram.
U.S. Appl. No. 16/610,176, filed Dec. 11, 2019, Markram.
U.S. Appl. No. 16/710,080, filed Dec. 11, 2019, Markram.
U.S. Appl. No. 17/783,976, filed Jun. 9, 2022, Markram.
U.S. Appl. No. 17/783,978, filed Jun. 9, 2022, Markram.
U.S. Appl. No. 17/783,981, filed Jun. 9, 2022, Markram.
U.S. Appl. No. 17/454,347, filed Nov. 10, 2021, Lütgechetmann.

* cited by examiner

GENERATING AND IDENTIFYING FUNCTIONAL SUBNETWORKS WITHIN STRUCTURAL NETWORKS

RELATED APPLICATION

This application claims the benefit of U.S. Provisional Application 62/443,071 filed 6 Jan. 2017, the entire contents of which is incorporated herein by reference.

TECHNICAL FIELD

This invention relates to neural networks, and more particularly to methods and tools for generating and identifying functional subnetworks within structural networks.

BACKGROUND

In simple neural networks that have a limited number of vertices and structural connections between the vertices, the function of the neural network can be understood by a determined analysis of the topology and the weights in the neural networks.

In neural networks of increased complexity, such analyses become untenable. Even if the complete network topology is known, human oversight is lost and the function of subnetworks inscrutable.

A neural network device is a device that mimics the information encoding and other processing capabilities of networks of biological neurons using a system of interconnected nodes. A neural network device can be implemented in hardware, in software, or in combinations thereof.

A neural network device includes a plurality of nodes that are interconnected by a plurality of structural links. Nodes are discrete information processing constructs that are analogous to neurons in biological networks. Nodes generally process one or more input signals received over one or more of links to produce one or more output signals that are output over one or more of links. For example, in some implementations, nodes can be artificial neurons that weight and sum multiple input signals, pass the sum through one or more non-linear activation functions, and output one or more output signals. In some implementations, nodes can operate as accumulators, e.g., in accordance with an integrate-and-fire model.

Structural links are connections that are capable of transmitting signals between nodes. In some implementations, structural links are bidirectional links that convey a signal from every first node to a second node in the same manner as a signal is conveyed from the second to the first. However, this is not necessarily the case. For example, in a neural network, some portion or all of structural links can be unidirectional links that convey a signal from a first of nodes to a second of nodes without conveying signals from the second to the first. As another example, in some implementations, structural links can have diverse properties other than or in addition to directionality. For example, in some implementations, different structural links can carry signals of different magnitudes-resulting in a different strengths of interconnection between respective of nodes. As another example, different structural links can carry different types of signal (e.g., inhibitory and/or excitatory signals). Indeed, in some implementations, structural links can be modelled on the links between soma in biological systems and reflect at least a portion of the enormous morphological, chemical, and other diversity of such links.

SUMMARY

Methods and tools for generating and characterizing functional subnetworks of a neural network are described. The tools include a definition of functional edges that—at a particular period of time—constitute a functional subnetwork of a neural network. The definition is directional in that it specifies a direction of information propagation between vertices. The subnetworks are temporal constructs in that different functional subnetworks exit at different times during the operation of the neural network. In effect, the definition is a composite definition that it defines both the structural characteristics and functional characteristics of subnetworks within a neural network at different periods in time.

In a first aspect, a method includes providing a plurality of structural connections between vertices in a neural network, assigning a direction of information flow to respective of the structural connections, generating a first functional subgraph of the neural network, and generating a second functional subgraph of the neural network. The first functional subgraph includes a first proper subset of the structural connections, wherein vertices connected by the first proper subset of the structural connections are active during a first period of time. The second functional subgraph includes a second proper subset of the structural connections, wherein vertices connected by the second proper subset are active during a second period of time.

In a second aspect, a method includes generating a functional subgraph of a network from a structural graph of the network, wherein the structural graph comprises a set of vertices and structural connections between the vertices. Generating the functional subgraph comprises identifying a directed functional edge of the functional subgraph based on presence of structural connection and directional communication of information across the same structural connection.

In a third aspect, a method is suitable for characterizing a neural network that comprises a set of vertices and structural connections between the vertices. The method includes defining a functional subgraph in the neural network using a definition to identify a plurality of functional edges and analyzing the functional subgraph using one or more topological analyses. The definition can include a definition of a class of structural connection between two vertices in the set of vertices, and a definition of a directional response to a first input elicitable from the two vertices that satisfy the definition of the structural connection class.

In a fourth aspect, a method is suitable for distinguishing between inputs to a neural network that comprises a set of vertices and structural connections between the vertices. The method includes inputting a first input to the neural network; characterizing the response of the neural network to the first input using the method of the third aspect; inputting a second input to the neural network; characterizing the response of the neural network to the second input using the method of the third aspect; and distinguishing between the first input and the second input based on results of the respective topological analyses.

In a fifth aspect, for a network that comprises a set of vertices and structural connections between the vertices, a method comprising demarking a proper subset of the vertices and functional edges between the vertices in the subset as a directed subgraph, wherein the functional edges are defined based on a presence of structural connections between the vertices in the subset and directional information communication across the structural connections.

In a sixth aspect, a method of manufacturing a neural network includes any one the first aspect, the second aspect, the third aspect, the fourth aspect, or the fifth aspect.

In a seventh aspect, a method of analyzing performance of a neural network includes any one the first aspect, the second aspect, the third aspect, the fourth aspect, or the fifth aspect.

In an eighth aspect, wherein the second aspect can be used to generate the first functional subgraph and to generate the second functional subgraph in the first aspect.

Each one of the first aspect, the second aspect, the third aspect, the fourth aspect, or the fifth aspect can include one or more of the following features. Only some of the vertices connected by the second proper subset can be included in the first proper subset. The activity during the first period of time and the activity during the second period of time are both responsive to a same input. A plurality of structural connections can be provided by identifying the plurality of structural connection in a pre-existing neural network.

The direction of information flow can be assigned by determining the direction of information in the pre-existing neural network and assigning the direction in accordance with the determined direction. First and the second functional subgraphs of the neural network can be generated by inputting an input into the pre-existing neural network and identifying the first and the second functional subgraph based on the response of the pre-existing neural network to the input.

A first functional subgraph of the neural network can be generated by weighting the structural connections of the first proper subset to achieve a desired activity during the first period of time. A first functional subgraph of the neural network can be generated by training the first proper subset of the structural connections. A plurality of structural connections can be provided by adding structural connections between at least two functional subgraphs of the neural network.

A structural graph can include undirected structural connections between the vertices. A directed functional edge can be identified by requiring a direct structural connection between two vertices and a directional response to a first input elicitable from the two vertices. A directed functional edge can be identified by identifying a directional communication of information by requiring a response to a first input by a first vertex and a subsequent response by a second vertex. A response to the first input can be required to have occurred during a first time period defined with respect to the first input. The first time period can, e.g., by defined as occurring after an initial propagation of the first input through the functional subgraph. The subsequent response can be required to have occurred during a second time period defined with respect to either the first time period or the response to the first input. The second time period can begin immediately after the first time period ends. The second time period can overlaps with the first time period.

The directed functional edge of the functional subgraph can also be identified based on presence of second structural connection and directional communication of information across the second structural connection. The directed functional edge can be identified by identifying a plurality of directed functional edges and classifying the plurality of directed functional edges as the functional subgraph.

A definition of the class of a structural connection can require a direct structural connection between two of the vertices, e.g., a undirected structural connection. A definition of a directional response can require a response to the first input by a first vertex of the two vertices, and a subsequent response by a second vertex of the two vertices. The response to the first input can be required to have occurred during a first time period defined with respect to the first input. For example, the first time period can be defined as occurring after an initial propagation of the first input through the functional subgraph. The subsequent response can be required to have occurred during a second time period defined with respect to either the first time period or the response to the first input. For example, the second time period begins immediately after the first time period ends or the second time period can overlap with the first time period.

A definition of a functional edge can include a definition of a second structural connection between two vertices in the set of vertices. A definition of a functional edge can include a definition of a second directional response to the first input elicitable from the two vertices that satisfy the definition of the second structural connection.

A functional subgraph can be analyzed by determining a simplex count based on the defined functional edges. A simplex count can be determined by determining at least one of a 1-dimensional simplex count and a 2-dimensional simplex count. A functional subgraph can be analyzed by determining Betti numbers for a network that consists of the defined functional edges. Betti numbers can be determined by determining at least one of the first Betti number and the second Betti number. A functional subgraph can be analyzed by determining an Euler characteristic for a network that consists of the defined functional edges.

A first input and second input can be distinguished based on the respective topological analyses by classifying results of the respective topological analyses, e.g., using a probabilistic classifier. The probabilistic classifier can be a Bayesian classifier.

An input to the network can be classified based on a topological analysis of the directed subgraph. For example, a classifier, e.g., a probabilistic classifier, can be applied to one or more topological metrics of the of the directed subgraph. The directional information communication across the structural connections can include information communication from a first vertex of the set to a second vertex of the set.

The details of one or more implementations are set forth in the accompanying drawings and the description below. Other features, objects, and advantages of the invention will be apparent from the description and drawings, and from the claims.

DETAILED DESCRIPTION

Figure 1:
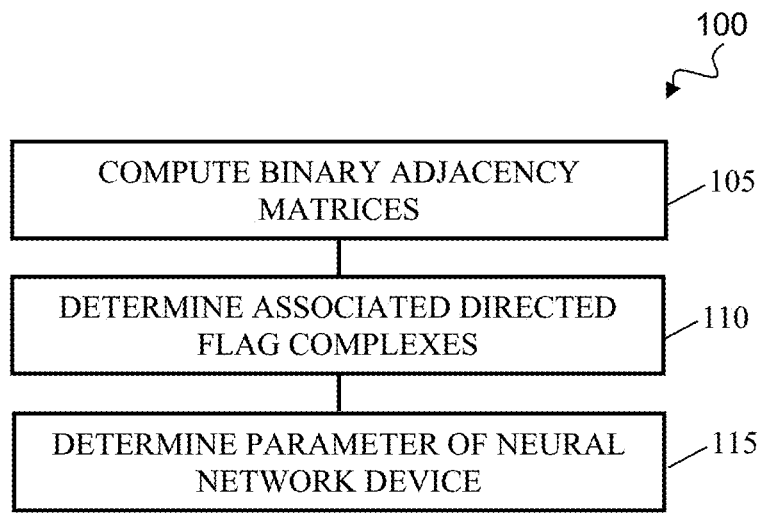
FIG. 1 is a flowchart of a process for characterizing parameters of a neural network device using topological methods.

Network topology is the arrangement of the various elements of a network, including neural network devices. In neural network devices, the elements include nodes and links between the nodes. In some neural network devices, the nodes can be modeled in one or more ways after biological neurons. Further, the links between the nodes can be modeled in one or more ways after the connections between biological neurons, including synapses, dendrites, and axons.

Even though the nodes and links of a neural network device can have a variety of different characteristics, their network topology can be characterized using various topological methods. Topological characterizations of a networks tend to focus on the connections between elements rather than the exact shape of the objects involved.

The topological methods described herein can be used to characterize structural connections between nodes in neural network, functional connections between nodes in neural network, or both. In a neural network, a structural connection between nodes may provide a link between two nodes over which a signal can be transmitted. In contrast, a functional connection reflects the actual transmission of information from one node to the other over the structural connection, i.e., is part of the "functioning" of the neural network. For example, the signal transmission can be part of active information processing and/or information storage by the neural network. In a particular example, a functional connection between two nodes may arise in response to an input and may indicate active participation of those nodes in processing the information content of the input.

Structural characterizations of neural network devices can be used, e.g., in the construction and/or reconstruction of neural networks. Reconstruction of a neural network can include, e.g., copying or mimicking at least some of the structure of a first neural network in a second neural network. For example, a simpler second neural network can recreate a portion of the structure of a more complex first neural network. In some implementations, the first neural network can be a biological neural network and the second neural network can be an artificial neural network, although this is not necessarily the case.

In some implementations, the neural network devices need not be mere reconstructions. Rather, neural network devices can also be constructed or, in effect, "manufactured" ab initio. In some implementations, the characterizations provided by topological methods can provide general characteristics of desirable structure in neural network devices. For example, the topological characterizations may define a desired level of "structuring" or "ordering" of the neural network device.

By way of example, topological characterizations can be used to construct and reconstruct neural networks in which the distribution of directed cliques (directed all-to-all connected subsets) of neurons by size differs significantly from both that in Erdos-Renyi random graphs with the same number of vertices and the same average connection probability and that in more sophisticated random graphs, constructed either by taking into account distance-dependent probabilities varying within and between cortical layers or morphological types of neurons, or according to Peters' Rule. In particular, the neural network devices can include highly prominent motifs of directed cliques of up to eight neurons. For example, in neural networks with approximately $3 \times 10e4$ vertices and $8 \times 10e6$ edges, the neural networks can incorporate approximately 10e8 3-cliques and 4-cliques, approximately 10e7 5-cliques, approximately 10e5 6-cliques, and approximately 10e3 7-cliques.

As another example, topological methods can be used to construct or reconstruct neural networks in which the Euler characteristic (EC) of the neural networks can be a value on the order of 10e7, indicating a preponderance of directed cliques consisting of an odd number of neurons.

As another example, topological methods can be used to construct or reconstruct neural networks in which the homological dimension of the neural networks is 5, which compares to the homological dimension of at most 4 for random graphs and hence indicates that the neural networks possess a higher degree of organizational complexity than random graphs. The homological dimension of a neural network is the maximum n such that $\beta_n$ is not equal to zero, wherein $\beta_0$, $\beta_1$, $\beta_2$, . . . are Betti numbers that provide a measure the higher-order organizational complexity of the network by detecting "cyclic" chains of intersecting directed cliques.

The topological methods described herein can also use defined functional patterns of communication across multiple links to characterize the processing activity within neural network devices. The presence of the functional patterns indicates "structuring" or "ordering" of the information flow along the nodes and links of the neural network device under particular circumstances. Such functional characterizations thus characterize neural network devices in ways that are lost when mere structural information is considered.

In some implementations, characterizations of the patterns of communication across multiple links in a neural network device can be used in the construction and/or reconstruction of neural networks. Reconstruction of a neural network can include, e.g., copying or mimicking at least some of the function of a first neural network in a second neural network. For example, a simpler second neural network can recreate a portion of the functioning of a more complex first neural network. In some implementations, the first neural network can be a biological neural network and the second neural network can be an artificial neural network, although this is not necessarily the case.

In some implementations, neural network devices that are characterized based on defined patterns of communication across multiple links need not be mere reconstructions. Rather, the function of neural network devices can be constructed or, in effect, "manufactured" ab initio. In some implementations, the characterizations provided by topological methods can provide general characteristics of the functional behavior of a desirable neural network device. This can be beneficial to, e.g., reduce training time or even provide a partially- or fully-functional neural network device "out of the box." In other words, the topological characterizations may define a desired level of "structuring" or "ordering" of the information flow within a functioning neural network device. In some implementations, functional sub-networks can be assembled like components, e.g., by adding structural links between different functional sub-networks to achieve desired processing results.

For example, in some implementations, the topological characterizations may define particular functional responses to particular input patterns. For example, a given stimulus can be applied repeatedly to a neural network device and the responsive activity within the neural network device can be measured. The activity can be binned into timesteps and characterized using topological techniques. For example, the topological techniques can be akin to those used to characterize the structure of a neural network device. In some implementations, a transmission-response graph can be generated for each timestep to represent the activity in the neural network device in a manner suited for analysis using topological methods. In particular, in a transmission-response graph, the vertices are the nodes of the neural network device and the edges are the links between the nodes that are active during the timestep leads. The activity can be, e.g., signal transmissions along the link that leads to firing of a connected node. In some cases, the duration of the timesteps and the precise rule for formation of the transmission-response graph for each timestep can be biologically motivated.

FIG. 1 is a flowchart of a process 100 for characterizing parameters of a neural network device using topological methods. In the flowchart, the topological parameters characterized using process 100 are structural and characterize nodes and their links, i.e., without encompassing the activity in the neural network and its function. Such structural parameters can be used, e.g., to construct or reconstruct a neural network device.

As discussed further below, in other implementations, functional rather than structural topological parameters can be characterized. For example, rather than determining a structural adjacency matrix, a functional connectivity matrix can be determined. Nevertheless, topological techniques can be applied to characterize the functional activity of nodes and their links. Such functional parameters can be used, e.g., to construct or reconstruct a neural network device that has desirable processing activity.

As another example, such functional parameters can be used to distinguish different inputs into the neural network device.

In the illustrated implementation, process 100 includes computing binary adjacency matrices for a neural network device at 105. An adjacency matrix is a square matrix that can be used to represent a finite graph, e.g., such as a finite graph that itself represents a neural network device. The entries in an adjacency matrix—generally, a binary bit (i.e., a "1" or a "0")—indicate whether pairs of nodes are structurally linked or not in the graph. Because each entry only requires one bit, a neural network device can be represented in a very compact way.

Process 100 also includes determining associated directed flag complexes at 110. Directed flag complexes are oriented simplicial complexes that encode the connectivity and the direction of orders of the underlying directed graph. In particular, each directed n-clique in the underlying graph corresponds to an oriented (n−1)-simplex in the flag complex and the faces of a simplex correspond to the directed subcliques of its associated directed clique. Associated directed flag complexes can be determined for structural links (e.g., the existence of directional links), for functional links (e.g., directed activity along links), or both.

Figure 2:
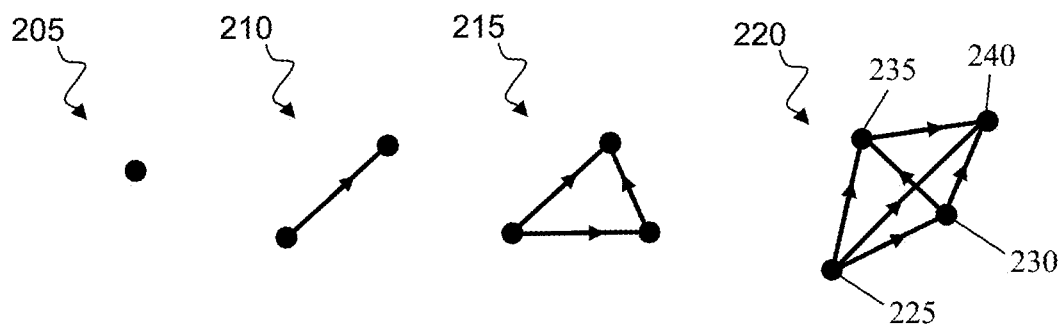
FIG. 2 is a schematic representation of different oriented simplices.

FIG. 2 is a schematic representation of different oriented simplices 205, 210, 215, 220. Simplex 205 has a dimension 0, simplex 210 has a dimension 1, simplex 215 has a dimension 2, and simplex 220 has a dimension 3. Simplices 205, 210, 215, 220 are oriented simplices in that simplices 205, 210, 215, 220 have a fixed orientation (that is, there is a linear ordering of the nodes). The orientation can embody the structure if the links, the function of the links, or both.

In the figures, the nodes of the neural network device are represented as dots whereas the links between the nodes are represented as lines connecting these dots. The lines include arrows that denote either the direction of structural link or the direction of activity along the link. For the sake of convenience, all links herein are illustrated as unidirectional links, although this is not necessarily the case.

The nodes and links in a neural network device can be treated as vertices and edges in topological methods. The network or subnetwork of nodes and links can be treated as a graph or a subgraph in topological methods. For this reason, the terms are used interchangeably herein.

Figure 3:
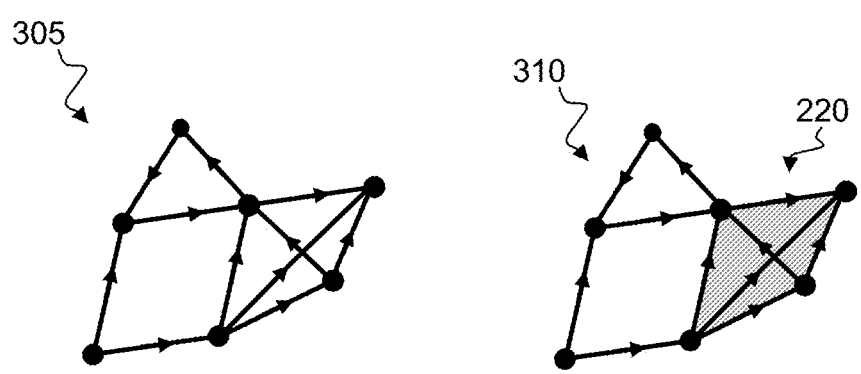
FIG. 3 is a schematic representation of an example directed graph and its associated flag complex.

FIG. 3 is a schematic representation of an example directed graph 305 and its associated flag complex 310. In further detail, a "directed graph" $\mathcal{G}$ consists of a pair of finite sets (V, E) and a function $\tau$: E→V×V. The elements of the set V are the or "vertices" of $\mathcal{G}$, the elements of E are the "edges" of $\mathcal{G}$, and the function $\tau$ associates with each edge an ordered pair of vertices. The "direction" of a connection or edge e with t (e)=(v1, v2) is taken to be from $\tau_1(e)=v_1$, the source node or vertex, to $\tau_2(v)=v_2$, the target vertex.

The function $\tau$ is required to satisfy the following two conditions.

(1) For each e∈E, if $\tau(e)=(v_1, v_2)$, then $v_1 \neq v_2$, i.e., there are no loops in the graph.

(2) The function $\tau$ is injective, i.e., for any pair of vertices $(v_1, v_2)$, there is at most one edge directed from $v_1$ to $v_2$.

A vertex v∈ $\mathcal{G}$ is said to be a "sink" if $\tau_1(e) \neq v$ for all e∈E.
A vertex v∈ $\mathcal{G}$ is said to be a "source" if $\tau_2(e) \neq v$ for all e∈E.

A "morphism of directed graphs" from a directed graph $\mathcal{G}=(V, E, \tau)$ to a directed graph $\mathcal{G}'=(V',E', \tau')$ consists of a pair of set maps $\alpha$: V→V' and $\beta$: E→E' such that $\beta$ takes an edge in $\mathcal{G}$ with source $v_1$ and target $v_2$ to an edge in $\mathcal{G}'$ with source $\alpha(v_1)$ and target $\alpha(v_2)$, i.e., $\tau' \circ \beta = (\alpha, \alpha) \circ \tau$. Two graphs $\mathcal{G}$ and $\mathcal{G}'$ are "isomorphic" if there is morphism of graphs $(\alpha, \beta)$: $\mathcal{G} \to \mathcal{G}'$ such that both $\alpha$ and $\beta$ are bijections, which can be called an "isomorphism of directed graphs."

A "path" in a directed graph $\mathcal{G}$ consists of a sequence of edges $(e_1, \ldots, e_n)$ such that for all $1 \leq k < n$, the target of $e_k$ is the source of $e_{k+1}$, i.e., $\tau_2(e_k)=\tau_1(e_{k+1})$. The "length" of the path $(e_1, \ldots, e_n)$ is n, i.e., the number of edges of which the path is composed. If, in addition, target of $e_n$ is the source of $e_1$, i.e., $\tau_2(e_n)=\tau_1(e_1)$, then $(e_1, \ldots, e_n)$ is an "oriented cycle."

An "abstract oriented simplicial complex" is a collection S of finite, ordered sets with the property that if $\sigma \in S$, then every subset $\tau$ of $\sigma$ is also a member of S. A "subcomplex" of an abstract oriented simplicial complex is a sub-collection S'⊆S that is itself an abstract oriented simplicial complex. For the sake of convenience, abstract oriented simplicial complexes are referred to herein as "simplicial complexes."

The elements of a simplicial complex S are called its "simplices." A simplicial complex is said to be "finite" if it has only finitely many simplices. If $\sigma \in S$, we define the "dimension" of $\sigma$, denoted dim($\sigma$), to be $|\sigma|-1$, i.e., the cardinality of the set $\sigma$ minus one. If $\sigma$ is a simplex of dimension n, then we refer to $\sigma$ as an n-simplex of S. The set of all n-simplices of S is denoted $S_n$. A simplex $\tau$ is said to be a face of $\sigma$ if $\tau$ is a subset of $\sigma$ of a strictly smaller cardinality. A "front face" of an n-simplex $\sigma=(v_0, \ldots, v_n)$ is a face $\tau=(v_0, \ldots, v_m)$ for some m<n. Similarly, a "back face" of $\sigma$ is a face $\tau'=(v_i, \ldots, v_n)$ for some 0<i<n. If $\sigma= (v_0, \ldots, v_n) \in S_n$, then the $i^{th}$ face of $\sigma$ is the (n−1)-simplex $\sigma^i$ obtained from $\sigma$ by removing the node or vertex $v_i$.

A simplicial complex gives rise to a topological space by means of the construction known as "geometric realization." In brief, one associates a point (a standard geometric 0-simplex) with each 0-simplex, a line segment (a standard geometric 1-simplex) with each 1-simplex, a filled-in triangle (a standard geometric 2-simplex) with each 2-simplex, etc., glued together along common faces. The intersection of two simplices in S, neither of which is a face of the other, is a proper subset, and hence a face, of both of them. In the geometric realization this means that the geometric simplices that realize the abstract simplices intersect on common faces, and hence give rise to a well-defined geometric object. A geometric n-simplex is nothing but a (n+1)-clique, canonically realized as a geometric object. An n-simplex is said to be "oriented" if there is a linear ordering on its vertices. In this case the corresponding (n+1)-clique is said to be a "directed (n+1)-clique."

If S is a simplicial complex, then the union $S^{(n)} = S_n \cup \ldots \cup S_0$, which is called the "n-skeleton" of S, is a subcomplex of S. We say that S is "n-dimensional" if $S=S^{(n)}$, and n is minimal with this property. If S is n-dimensional, and k≤n, then the collection $S_k \cup \ldots \cup S_n$ is not a subcomplex of S because it is not closed under taking subsets. However if one adds to that collection all the faces of all simplices in $S_k \cup \ldots \cup S_n$, one obtains a subcomplex of S called the "k-coskeleton" of S, which we will denote by $S_{(k)}$.

Directed graphs such as directed graph 305 give rise to abstract oriented simplicial complexes. Let $\mathcal{G}=(V, E, \tau)$ be a directed graph. The "directed flag complex" associated with $\mathcal{G}$ is the abstract simplicial complex $S=S(\mathcal{G})$, with $S_0=V$ and whose n-simplices $S_n$ for n≥1 are (n+1)-tuples $(v_0, \ldots, v_n)$, of vertices such that for each 0≤i<j≤n, there is an edge (or connection) in $\mathcal{G}$ from $v_i$ to $v_j$. Notice that because of the assumptions on τ, an n-simplex in S is characterised by the (ordered) sequence $(v_0, \ldots v_n)$, but not by the underlying set of nodes or vertices. For instance $(v_1, v_2, v_3)$ and $(v_2, v_1, v_3)$ are distinct 2-simplices with the same set of vertices.

Returning to process 100 and FIG. 1, for each node in the neural network device, there is a vertex in the underlying directed graph that is labelled with the unique global identification number (GID). The (j, k)-coefficient of the structural adjacency matrix is a binary "1" if and only if there is a directed connection in the neural network from the node/vertex with GID j to the node/vertex with GID k. The adjacency matrix can thus be referred to as the "structural matrix" of the neural network and the directed flag complex can be referred to as a "neocortical microcircuit complex" or "N-complex."

Process 100 also includes determining a parameter of a neural network device based on the relevant matrix and/or the N-complex using topological methods at 115. There are several different parameters that can be determined.

For example, the simplices in the neural network in each dimension can simply be counted. Such simplex counts can indicate the degree of "structuring" or "ordering" of the nodes and connections (or the activity) within the neural network device. As another example, the Euler characteristic of all N-complexes can be computed. As yet another example, the Betti numbers of a simplicial complex can be computed. In particular, the n-th Betti number, $\beta_n$, counts the number of chains of simplices intersecting along faces to create an "n-dimensional hole" in the complex, which requires a certain degree of organization among the simplices.

Figure 4:
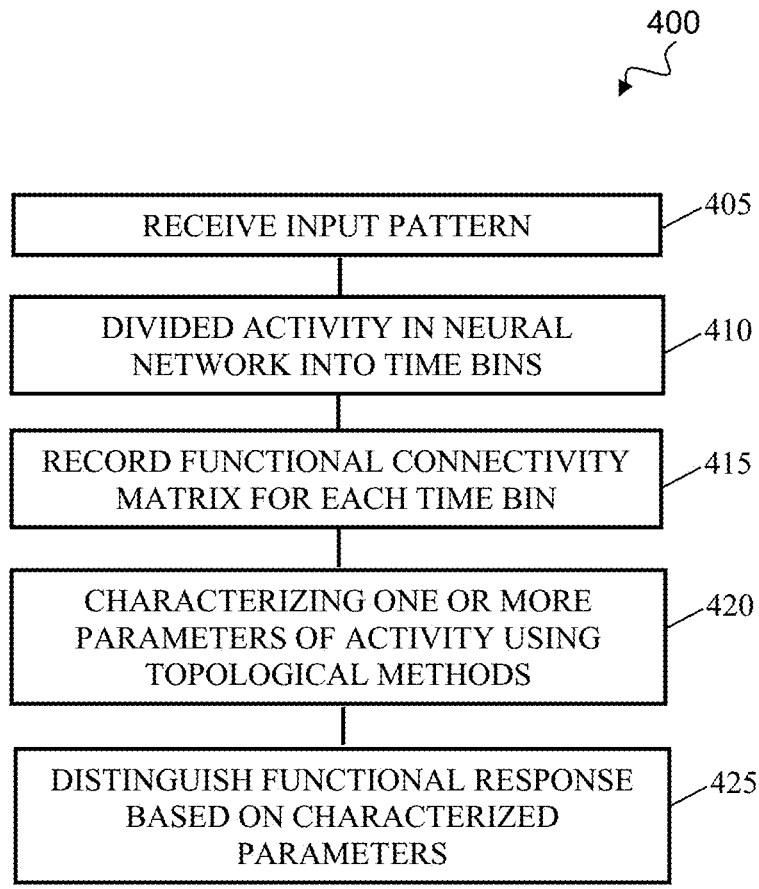
FIG. 4 is a flowchart of a process for distinguishing functional responses to different input patterns fed into a neural network.

FIG. 4 is a flowchart of a process 400 for distinguishing—using topological methods—functional responses to different input patterns fed into a neural network.

Process 400 includes receiving, at the neural network, one or more input patterns at 405. In some implementations, the one or more input patterns can correspond to a known input. For example, process 400 can be part of the training of a neural network, the design of a process for reading the processed output of a neural network, the testing of a neural network, and/or the analysis of an operational neural network. In these cases, known input patterns can be used to confirm that the functional response of the neural network is appropriate. In other implementations, the one or more input patterns can correspond to an unknown input(s). For example, process 400 can be part of the operation of a trained neural network and the functional response of the neural network can represent the processed output of the neural network.

Process 400 also includes dividing the activity in neural network into time bins at 410. A time bin is a duration of time. The total functional activity in a neural network responsive to an input pattern (e.g., signal transmission along edges and/or nodes) can be subdivided according the time in which the activity is observed.

In some implementations, the duration of the time bins can be chosen based on the extent to which activity in each bin is distinguishable when different input patterns are received. Such an ex post analysis can be used, e.g., when designing a process for reading the processed output of a neural network using input patterns that correspond to known inputs. In other words, the process for reading the output of a neural network can be adapted to the observed activity responsive to different input patterns. This can be done, e.g., to ensure that the process for reading the neural network appropriately captures the processing results when input patterns that correspond to unknown inputs are received.

In some implementations, the duration of the time bins can be constant. For example, in neural network devices that are modeled after biological neural networks, the duration of the time bins can be 5 ms.

In some implementations, the time bins can commence after the input pattern is received at the neural network. Such a delay can allow the input pattern to propagate to relevant portions of the neural network device prior to meaningful processing results are expected. Subsequent time bins can be defined with respect to an end of a preceding time bin or with respect to the time after the input pattern is received.

Process 400 also includes recording a functional connectivity matrix for each time bin at 415. A functional connectivity matrix is a measure of the response of each edge or link in a neural network device to a given input pattern during a time bin. In some implementations, a functional connectivity matrix is a binary matrix where active and inactive edges/links are denoted (e.g., with a binary "1" and "0", respectively). A functional connectivity matrix is thus akin to a structural adjacency matrix except that the functional connectivity matrix captures activity.

In some implementations, an edge or connection can be denoted as "active" when a signal is transmitted along the edge or connection from a transmitting node to a receiving node during the relevant time bin and when the receiving node or vertex responds to the transmitted signal by subsequently transmitting a second signal.

In general, the responsive second signal need not be transmitted within the same time bin as the received signal. Rather, the responsive second signal can be transmitted within some duration after the received signal, e.g., in a subsequent time bin. In some implementations, responsive second signals can be identified by identifying signals that are transmitted by the receiving node within a fixed duration after the receiving node receives the first signal. For example, the duration can be about 1.5 times as long as the duration of a time bin, or about 7.5 ms in neural network devices that are modeled after biological neural networks.

In general, the responsive second signal need not be responsive solely to single signal received by the node. Rather, multiple signals can be received by the receiving node (e.g., along multiple edges or connections). The receiving node or vertex can "respond" to all or a portion of the received signals in accordance with the particularities of the information processing performed by that node. In other words, as discussed above, the receiving node or vertex can, e.g., weight and sum multiple input signals, pass the sum through one or more non-linear activation functions, and output one or more output signals, e.g., as an accumulator, e.g., in accordance with an integrate-and-fire model.

In some implementations, the transmitted signals are spikes and each (j, k)-coefficient in a functional connectivity matrix is denoted as "active" if and only if the following three conditions are satisfied, where $s_i^j$ denotes the time of the i-th spike of node j:

(1) The (j, k)-coefficient of the structural matrix is 1, i.e., there is a structural connection from the node or vertex j to the node or vertex k;

(2) the node or vertex with GID j spikes in the n-th time bin; and (3) the node or vertex with GID k spikes within an interval after the neuron with GID j.

In effect, it is assumed that spiking of node or vertex k is influenced by the spiking of node or vertex j.

Process 400 also includes characterizing one or more parameters of the activity recorded in the functional connectivity matrix using topological methods at 420. For example, the activity recorded in the functional connectivity matrix can be characterized using one or more of the approaches used in process 100 (FIG. 1), substituting the functional connectivity matrix for the structural adjacency matrix. For example, a characterization of a topological parameter of the neural network device can be determined for different functional connectivity matrices from different time bins. In effect, the structuring or ordering of the activity in the neural network can be determined at different times.

Process 400 also includes distinguishing the functional response of the neural network device to a received input pattern from other functional responses of the neural network device to other received input patterns based on the characterized topological parameters at 425. As discussed above, in some instances, input patterns that correspond to known inputs can be used in a variety contexts. For example, during testing of a neural network, distinguishing the functional response of the neural network device to a received input pattern from functional responses of the neural network device to other patterns can indicate whether the neural network device is functioning properly. As another example, during training of a neural network, distinguishing the functional response of the neural network device to a received input pattern from functional responses of the neural network device to other patterns can provide an indication that training is complete. As another example, in analyzing an operational neural network, distinguishing the functional response of the neural network device to a received input pattern from functional responses of the neural network device to other patterns can provide an indication of the processing performed by the neural network device.

In instances wherein the input patterns can correspond to unknown inputs, distinguishing the functional response of the neural network device to a received input pattern from functional responses of the neural network device to other patterns can be used to read the output of the neural network device.

Distinguishing functional responses to different input patterns fed into a neural network using topological methods can also be performed in a variety of other contexts. For example, changes in functional responses over time can be used to identify the results of training and/or the structures associated with training.

A number of implementations have been described. Nevertheless, it will be understood that various modifications may be made. Accordingly, other embodiments are within the scope of the following claims.

What is claimed is:

1. A computer-implemented method for reading results of information processing within an artificial neural network in which nodes operate as accumulators, the method comprising:

providing a plurality of nodes and structural links between the nodes in the artificial neural network, wherein information flows in a direction along respective of the structural links;

processing, with the artificial neural network, inputs into the artificial neural network, wherein, at different times during the processing, different subsets of the structural links are active;

generating a first functional subgraph of the artificial neural network, wherein the first functional subgraph includes a first proper subset of the nodes and the links therebetween, wherein the first proper subset includes links in the artificial neural network that transmit signals during a first period of time during the processing and excludes links in the artificial neural network that do not transmit signals during the first period of time, wherein the signals used to generate the first functional subgraph are transmitted responsive to a first input into the artificial neural network;

generating a second functional subgraph of the artificial neural network, wherein the second functional subgraph includes a second proper subset of the nodes and the links therebetween, wherein the second proper subset includes links in the artificial neural network that transmit signals during a second period of time during the processing and excludes links in the artificial neural network that do not transmit signals during the second period of time, wherein the signals used to generate the second functional subgraph are transmitted responsive to a second input into the artificial neural network and the second period of time differs from the first period of time, wherein at least some of the nodes in the second proper subset are included in the first proper subset; and distinguishing between the first input and the second input based on the first functional subgraph and the second functional subgraph.

2. The method of claim 1, wherein only some of the nodes in the second proper subset are included in the first proper subset.

3. The method of claim 1, wherein providing the plurality of structural links between nodes comprises providing a pre-existing artificial neural network.

4. The method of claim 3, further comprising determining the direction of the information flows in the pre-existing artificial neural network.

5. The method of claim 1, wherein providing the plurality of structural links comprises forming the plurality of structural links in a new artificial neural network.

6. The method of claim 1, wherein generating the first and the second functional subgraph of the artificial neural network comprises inputting the first and the second input into the pre-existing artificial neural network and identifying the first and the second functional subgraph based on the response of the pre-existing artificial neural network to the input.

7. The method of claim 1, further comprising manufacturing a second artificial neural network based on the first and second functional subgraphs, wherein an Euler characteristic in the manufactured artificial neural network indicates a preponderance of directed cliques consisting of an odd number of nodes.

8. The method of claim 1, wherein generating the second functional subgraph of the artificial neural network comprises weighting the structural links of the second proper subset to achieve desired signal transmission activity during the second period of time.

9. The method of claim 1, wherein generating the first functional subgraph of the artificial neural network comprises training the first proper subset of the nodes and the structural links therebetween.

10. The method of claim 1, wherein providing the plurality of structural links comprises adding structural links between the at least two functional subgraphs of the artificial neural network.

11. The method of claim 1, further comprising distinguishing functional responses of the first artificial neural network to different inputs based on differences between the first functional subgraph and the second functional subgraph.

12. The method of claim 1, wherein the first functional subgraph and the second functional subgraph are functional connectivity matrices that denote both active and inactive links.

13. A computer-implemented method, the method comprising:
   processing, using a first artificial neural network in which nodes operate as accumulators, an input into the first artificial neural network; and
   generating a functional subgraph of the first artificial neural network from a structural graph of the first artificial neural network, wherein the structural graph comprises a set of vertices and structural connections between the vertices, wherein generating the functional subgraph comprises identifying directed flag complexes of directed functional edges of the functional subgraph based on presence of structural connection and directional communication of information across the same structural connection, wherein the directed functional edges are edges that are active in the first artificial neural network during [[the processing of the input into the first artificial neural network and excludes links in the first artificial neural network that are inactive during the processing; and
   training a second artificial neural network in which nodes operate as accumulators to generate the functional subgraph during processing of the input using the second artificial neural network.

14. The method of claim 13, wherein the directed functional edges of the directed flag complexes require a direct structural connection between two vertices and that a directional response to a first input is elicited from the two vertices.

15. The method of claim 13, wherein the directed functional edges of the directed flag complexes require a response to a first input by a first vertex and a subsequent response by a second vertex.

16. The method of claim 15, wherein the response to the first input is required to have occurred during a first time period defined with respect to the first input.

17. The method of claim 16, wherein the first time period is defined as occurring after an initial propagation of the first input through the functional subgraph.

18. The method of claim 15, wherein the subsequent response is required to have occurred during a second time period defined with respect to either the first time period or the response to the first input.

19. The method of claim 18, wherein the second time period overlaps with the first time period.

20. The method of claim 13, wherein:
   generating the functional subgraph comprises identifying a plurality of directed functional edges during a first period of time; and
   the method further comprises generating a second functional subgraph of the network from the structural graph of the network, wherein generating the second functional subgraph comprises identifying directed flag complexes of a second plurality of directed functional edges based on presence of structural connections and directional communication of information during a second period of time.

21. The method of claim 20, further comprising distinguishing functional responses of the first artificial neural network to different inputs based on differences between the functional subgraph and the second functional subgraph.

22. The method of claim 13, wherein the functional subgraph is a functional connectivity matrix that denotes both active and inactive links.

23. A computer-implemented method for training an artificial neural network in which nodes operate as accumulators, comprising:
   providing a plurality of structural links between nodes in the artificial neural network, wherein information flows in a direction along respective of the structural links;
   processing, with the artificial neural network, an input into the artificial neural network, wherein, at different times during the processing, different subsets of the structural links transmit signals responsive to the input;
   generating a first functional subgraph of the artificial neural network, wherein the first functional subgraph includes a first proper subset of the nodes and the structural links therebetween that transmit signals responsive to the input during a first period of time, and wherein generating the first functional subgraph of the artificial neural network comprises training the first proper subset of the nodes and the links therebetween to transmit the signals during the first period of time; and
   generating a second functional subgraph of the artificial neural network, wherein the second functional subgraph includes a second proper subset of the nodes and the structural links therebetween that transmit signals responsive to the input during a second period of time, and wherein generating the second functional subgraph of the artificial neural network comprises training the second proper subset of the nodes and the links therebetween to transmit the signals during the second period of time, wherein the second period of time differs from the first period of time, wherein at least some of the nodes in the second proper subset are included in the first proper subset.

* * * * *